United States Patent [19]

Osthus et al.

[11] Patent Number: 4,615,273

[45] Date of Patent: Oct. 7, 1986

[54] CONVEYORIZED TRANSPORT SYSTEM

[75] Inventors: Harold Osthus, Seattle, Wash.; Roald Nymark, Simsbury, Conn.

[73] Assignee: Gerber Garment Technology, Inc., Tolland, Conn.

[21] Appl. No.: 683,379

[22] Filed: Dec. 19, 1984

[51] Int. Cl.⁴ .............................................. E01B 25/26
[52] U.S. Cl. .................................... 104/102; 104/130; 104/172 S
[58] Field of Search ................... 104/48, 96, 102, 130, 104/172 S, 93, 110

[56] References Cited

U.S. PATENT DOCUMENTS

| | | | |
|---|---|---|---|
| 681,906 | 9/1901 | Bezanson | 104/48 |
| 2,688,931 | 9/1954 | Spafford | 104/48 X |
| 2,750,897 | 6/1956 | Davis | 104/96 |
| 2,840,006 | 6/1958 | Henderson | 104/102 |
| 3,046,909 | 7/1962 | Gorjanc | 104/102 |
| 3,242,874 | 3/1966 | Orwin | 104/172 S X |
| 4,542,698 | 9/1985 | Wakabayashi | 104/172 S X |

FOREIGN PATENT DOCUMENTS

| | | | |
|---|---|---|---|
| 83651 | 2/1977 | Australia | 104/48 |
| 1021863 | 2/1953 | France | 104/48 |

Primary Examiner—Randolph A. Reese
Assistant Examiner—David F. Hubbuch
Attorney, Agent, or Firm—McCormick, Paulding & Huber

[57] ABSTRACT

A conveyorized transport system which can be used to transport workpieces to a series of subsidiary loops, comprises a main rail, workpiece carrying trolleys movable on the main rail, a subsidiary loop adjacent to the main rail which leads to a work station, a special switch to transfer a trolley between the main rail and the subsidiary loop, and a computer to track and control the movement of the workpieces. The main rail and the subsidiary loop each have a gap laterally spaced from one another, and each switch includes a transfer rail section which can be moved laterally between the gap in the main rail and the gap in the subsidiary loop to transfer a trolley between the main rail and the subsidiary loop. One specific embodiment of the transport system also includes a chain-driven pusher extending downward from an overhead track which drives said trolley while it is being transferred between the main rail and the subsidiary loop.

19 Claims, 7 Drawing Figures

CONVEYORIZED TRANSPORT SYSTEM

BACKGROUND OF THE INVENTION

The invention relates to conveyorized transport systems, and more particularly to a computer controlled trolley and rail network providing flexible routing and reliable switching of trolleys as they travel to and from a plurality of work stations.

Conveyorized transport systems of the type with which this invention is concerned may, for example, be used in a garment making plant to carry workpieces to a series of work stations. In a factory without such a system a worker, in addition to performing a work operation on each workpiece, often has to punch a label attached to each workpiece to make a record of its status, sort the workpieces, and hand-carry them to various other work stations. These additional steps consume time and lead to other problems. For example, the time it takes a worker to perform various tasks is unpredictable and it is difficult for other plant personnel to keep track of the workpieces as they travel to and from the various stations, so production cannot be scheduled accurately. Also, it is common for operators to accumulate many workpieces before carrying them to a subsequent work station so there is much inventory tied up in the factory and with it, a high carrying cost. Furthermore, many times the operator will accumulate the workpieces in a pile in which case it is not easy to inspect them for quality control purposes.

There are conveyorized systems on the market today which utilize a main rail to guide workpiece carrying trolleys to subsidiary loops located along the main rail and each subsidiary loop leads to and from an associated work station. Between the main rail and each subsidiary loop are often two switches, one to divert a trolley and its workpieces from the main rail to the subsidiary loop and another to return the trolley from its subsidiary loop to the main rail. These prior art switches use pivoting fingers having their pivot axes on the main rail, and are similar in principle to those used in railroad tracks, except that the pivoting fingers slope in the vertical direction when they switch to a subsidiary loop because the points on the subsidiary loops engaged by the fingers are not at the same height as the main rail. The main rail is higher than the entrance of each subsidiary loop so the pivoting finger leading to the entrance must dip to meet it, and the main rail is lower than the exit of each loop so the pivoting finger leading from the exit must rise to meet it. The reason that the entrance and exit of each subsidiary loop is displaced vertically from the level of the main rail is to allow a trolley to move by gravity as it switches between the main rail and a subsidiary loop. The pivoting finger used to divert a trolley to the subsidiary loop is located upstream relative to the main rail of the pivoting finger used for returning the trolley.

When a trolley is on the main rail a narrow pusher, carried by a propelling chain or cable moving parallel to the main rail, urges it along. When the trolley enters onto a pivoting finger angled toward a subsidiary loop, the pusher loses contact with the trolley and the trolley then moves under the force of gravity alone. This phase of trolley movement, from the main rail, onto a switch finger, and then onto the rail of the associated subsidiary loop, is very critical since the gravity biased movement of the trolley can be disrupted by a number of factors, such as wind from an open door or excess friction in the trolley, and lead to jamming of the system.

Once the trolley leaves the main rail and enters a subsidiary loop it continues under the force of gravity down a sloping portion of the loop until it reaches a gate and then awaits attention by an operator. The operator may subsequently perform a work operation on some or all of the workpieces associated with that trolley and when done, opens the gate and allows the trolley to proceed further along the subsidiary loop. Typically, this leads to an elevator which lifts the trolley and its workpiece to a level slightly above the height of the main rail. In coordination with this, the pivoting finger of an associated switch swings across and upward from its position in line with the main rail to connect the subsidiary loop to the main rail. The elevator then releases the trolley which rolls under the force of gravity onto the main rail. This phase of trolley movement is also critical and subject to the disruptions described above.

Because the discharge switch of a subsidiary loop is located downstream of its entry switch relative to the main rail, another subsidiary loop at which a subsequent work operation is to be performed on the same workpieces as worked on at a first loop must be located downstream of the first loop. That is, the prior art system does not permit subsidiary loops, at which successive operations are to be performed on its same workpiece, to be located directly across from one another on opposite sides of the main rail, and as a result subsidiary loops cannot be easily concentrated in a given floor space, and flexibility of movement of trolleys between various work stations is limited.

It is accordingly a general object of the invention to provide a conveyorized transport system which offers high flexibility of trolley routing.

Another object of the invention is to provide a reliable mechanism for use in a conveyorized transport system of the foregoing type for switching trolleys between a main rail and a subsidiary loop.

It is yet another object of the invention to provide such a switch which can transfer a trolley to an entrance of a subsidiary loop and receive a trolley from an exit of the subsidiary loop, the entrance being downstream of the exit relative to the general direction of trolley movement on the main rail, so that direct recirculation is feasible, subsidiary loops can be located directly across the main rail from each other to form pairs, and a trolley can be transported to each subsidiary loop of a given pair in either order.

SUMMARY OF THE INVENTION

The present invention resides in a conveyorized transport system having a main rail upon which trolleys ride, subsidiary loops located along the main rail, each leading to and from a work station, and switching means for each subsidiary loop for transferring a trolley between the main rail and the subsidiary loop. The subsidiary loops each have an entrance and an exit, the entrance being downstream of the exit relative to the general direction of trolley movement on to the main rail, and the switch is able to deliver a carrier to the entrance and receive a carrier from the exit of each loop. This loop configuration provides flexibility in routing because it allows trolleys to be routed in two or more ways from the exit of a subsidiary loop. In accordance with one feature of the invention, while a trolley switches between the main rail and a subsidiary loop, the trolley is propelled by a positive driving force so that the switching is reliable, and in accordance with another feature, the main rail and a subsidiary loop each have a gap and the switch comprises a rail section which can be moved during switching from a first position bridging the gap in the main rail to a second position bridging the gap in the subsidiary loop to transfer a trolley from the main rail to the subsidiary loop. This type of switch also allows a trolley to be routed from one subsidiary loop to another one located directly across the main rail or vice versa, or from the discharge end of a subsidiary loop directly to the entrance of the same subsidiary loop for recirculation purposes.

DETAILED DESCRIPTION OF THE PREFERRED EMBODIMENT

Figure 1:
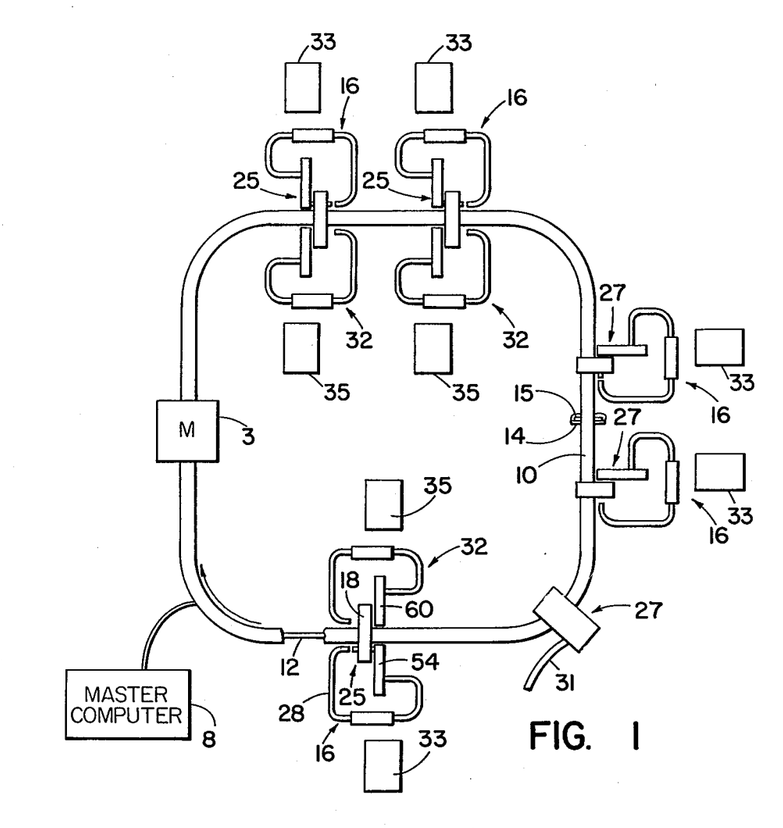
FIG. 1 is a top view of a conveyorized transport system embodying the present invention.

As illustrated in the figures, and first referring to FIG. 1, the conveyorized transport system according to the preferred embodiment of the invention includes a master computer 8, a propulsion track 10 having wide pushers 15, 15 extending downwardly from it, a drive unit 3 for the propulsion track 10, a main rail 12 situated beneath the propulsion track 10, trolleys 14, 14 riding on the rail 12 and propelled by the pushers 15, 15, and subsidiary loops 16, 16 and 32, 32 located along the main rail some of which are paired. Each subsidiary loop leads to and from a work station 33, 35 and the conveyorized transport system further includes three-position switches 25, 25 for routing the trolleys between the main rail and each pair of subsidiary loops or directly between the subsidiary loops of a given pair, and two-position switches 27, 27 for routing the trolleys between the main rail and each unpaired subsidiary loop or a diversion rail 31. The system of FIG. 1 includes a total of 8 subsidiary loops 16, 16 and 32, 32 and associated workstations, but this system can be easily modified to include more or fewer loops if desired. Also, a subsidiary loop can be used as a storage area instead of a site for a work station.

Figure 2:
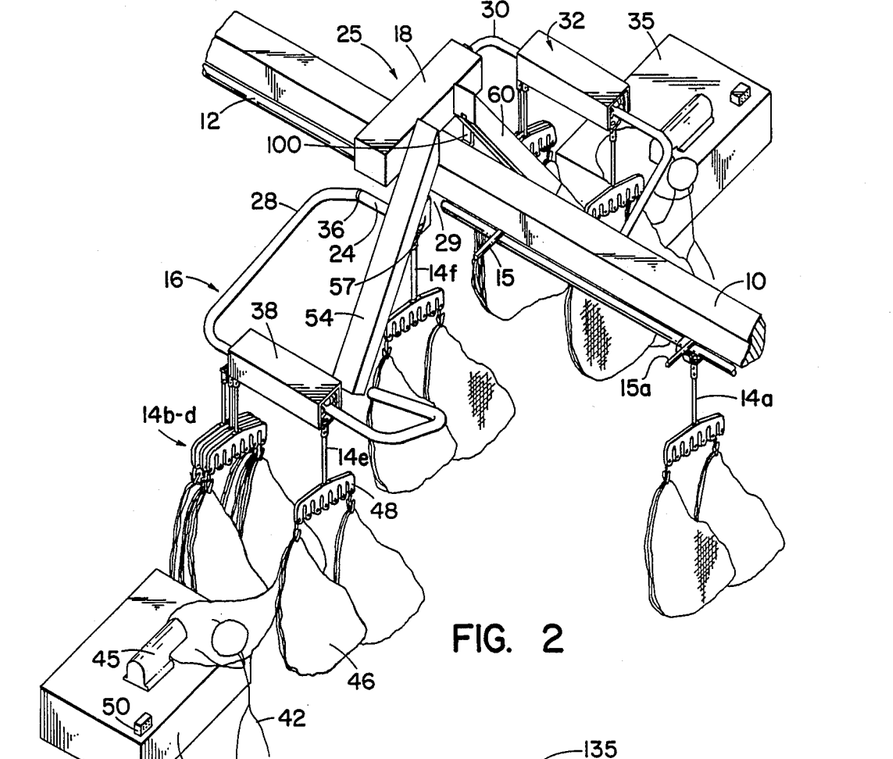
FIG. 2 is a perspective view of a section of the conveyorized transport system of FIG. 1 and includes a stretch of main rail and propulsion track plus two oppositely disposed subsidiary loops, associated work stations and an associated transfer switch.

FIG. 2 illustrates a section of the computer controlled, conveyorized transport system of FIG. 1, and shows the main rail 12, the propulsion track 10 situated over main rail 12 and a pair of subsidiary loops 16 and 32. One of the trolleys 14, specifically identified as 14a, rides on main rail 12 and is propelled by one of the pushers 15 specifically identified as 15a. Pusher 15a is one of a series of identical pushers uniformly spaced along and extending downwardly from the track 10. The pusher 15a itself is driven by an endless, moving chain located within the overhead propulsion track 10, and in FIG. 1, the pusher is shown moving trolley 14a toward the subsidiary loop 16. The subsidiary loop 16 includes looping rail 28, stop 38, and elevator 54, and the oppositely disposed subsidiary loop 32 is a mirror image of the loop 16. The main rail 12, transfer rail section 24, and the looping rails 28 and 30 preferably are made of a pipe or pipes.

The main rail 10, subsidiary loop 16, and subsidiary loop 32 each have a gap lined up with one other, and the switch 25 includes a straight section of rail 24 and an actuator apparatus 18 which is under computer control. Actuator apparatus 18 can move rail section 24 laterally between a first position (as shown) bridging the gap in subsidiary loop 16, a second position bridging the gap 29 in main rail 12, and a third position bridging a gap (not shown) in subsidiary loop 32. As the rail section 24 moves between its three positions, it can transfer a trolley 14 from the main rail 12 to either subsidiary loop or from the subsidiary loop 16 to the opposite subsidiary loop 32 or vice versa. While the trolley is on the transfer rail section 24, a pusher 15 continues to engage the trolley and exert a positive driving force on it since the pusher is wide enough to reach the trolley when the rail section is in any of its positions. If the transfer rail is in the gap of subsidiary loop 16, the pusher will continue to move the trolley until the trolley is past the transfer rail section and beyond the entrance 36 of the subsidiary loop.

Once the trolley reaches looping rail 28, the actuator returns the transfer rail 24 to the main rail 12 so that other trolleys can proceed down the main rail or be switched by the transfer rail station.

The looping pipe 28 of subsidiary loop 16 slopes downwardly from its entrance 36, the point where trolleys are received from transfer rail section 24 and committed to circulate within subsidiary loop 16, so that a trolley can roll along it under the force of gravity. About midway along the looping rail 28 is the stop 38 which has an upper gate and a lower gate within the stop (neither gate shown). The stop 38 is shown stacking up trolleys 14b-d at its upper gate, trolley 14b being first in line. There the trolleys 14b-d wait until an operator 42 is ready for one and presses a button on control box 50 to open the upstream gate of stop 38 and allow trolley 14b to roll to the downstream gate located at the base of stop 38 as has done trolley 14e previously. The purpose of using two gates in stop 38 is to allow one trolley to be isolated from the rest at the lower gate so that an operator has easy access to the workpieces carried by the isolated trolley.

After a trolley is isolated at the downstream gate of stop 38, an operator such as 42 can perform a work operation such as sewing with sewing machine 45. FIG. 2 shows operator 42 working on workpiece 46 which is carried by hanger 48 on trolley 14e. The particular type of carrier used in the conveyorized transport system is not critical to the inventive concept. When operator 42 has completed the work operation on some or all workpieces suspended from hanger 48, he or she can push a button on control box 50 to cause the downstream gate of stop 38 to open and allow trolley 14e to roll under the force of gravity down sloping rail 28 toward elevator 54.

At the base of elevator 54 is another stop (See FIG. 7) to collect trolleys while they wait their turn to be reloaded onto main rail 12. When the master computer senses a break in a parade of trolleys on the main rail 12 just upstream of transfer rail 24 and an absence of trolleys on transfer rail 24, the computer directs actuator 18 to move rail section 24 to subsidiary loop 16 and directs elevator 54 to elevate a trolley as it has done to trolley 14f shown in FIG. 1. Trolley 14f hangs from an elevator car which comprises a slotted track section 57 which receives the trolley.

After a trolley reaches the top of elevator 54 and the next pusher arrives from propulsion track 10, the pusher will urge the trolley from the slotted track section 57 of the elevator onto transfer rail section 24 which abuts the slotted track 57. The top of the elevator 54 is the discharge end of subsidiary loop 16. In one mode of operation, the computer directs actuator 18 to leave the transfer rail 24 in position at subsidiary loop 16 until the trolley is pushed back to the beginning of loop 16 to recirculate within the trolley within the same subsidiary loop. The mode selection is usually made via a routing program of the master computer but this first mode can also be selected manually via a switch on control box 50.

In a second mode of operation, after transfer rail 24 receives the trolley, the computer directs actuator 18 to draw transfer rail section 24 back into line with main rail 12 and after a few more moments of being pushed, the trolley will be back on main rail 12 and proceeding downstream, usually to another subsidiary loop and an associated work station.

In a third mode of operation, after transfer rail section 24 receives the trolley, the computer directs actuator 18 to move the transfer rail section further across the row of gaps into line with looping rail 30 to transfer the trolley to subsidiary loop 32. After circulating through subsidiary loop 32, the trolley can be transferrd in accordance with any mode of operation described above.

Figure 3:
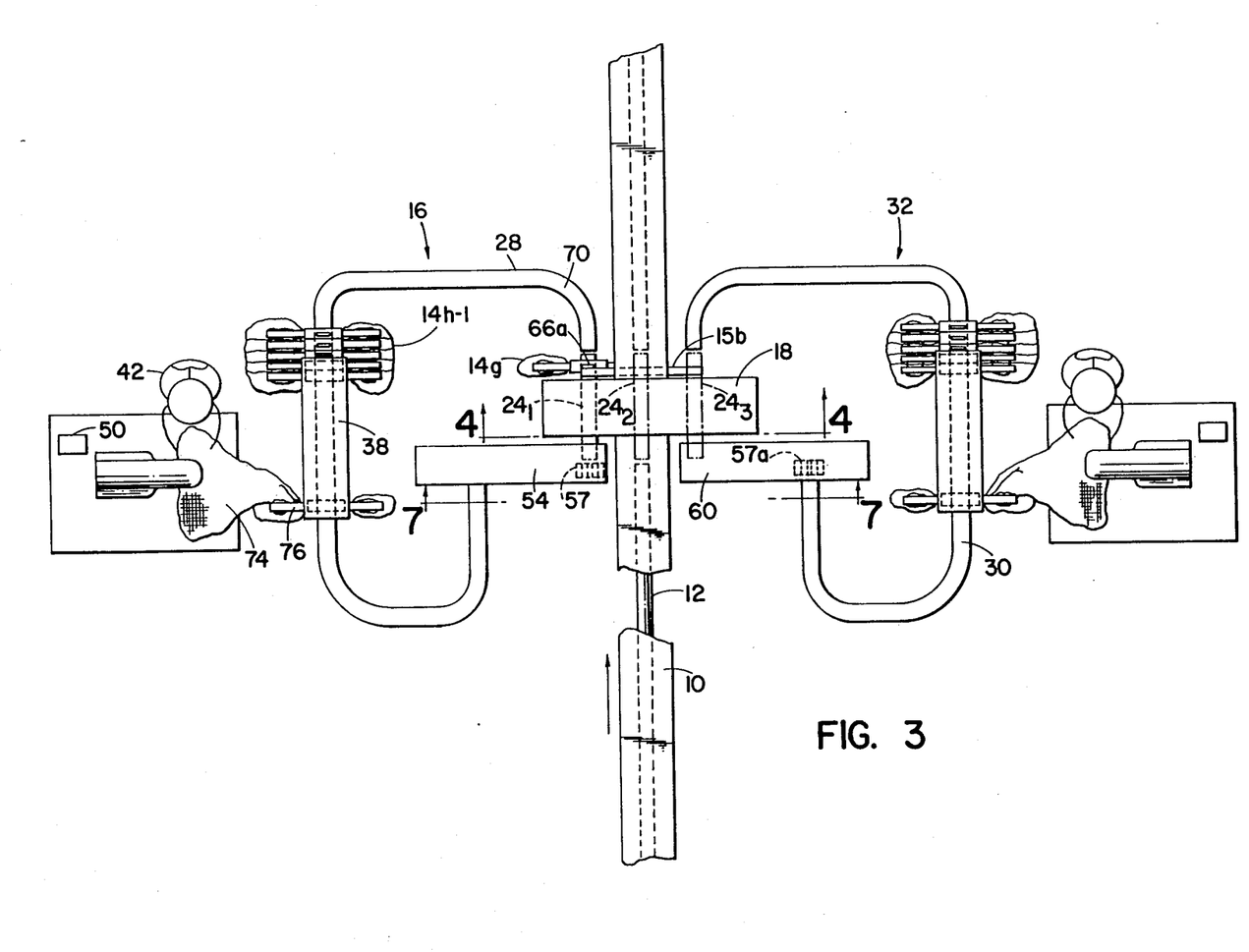
FIG. 3 is a top view of the section of the conveyorized transport system of FIG. 2 and illustrates three positions of a transfer switch.

FIG. 3 illustrates the three switching positions of transfer rail section 24. The solid lines show its position, referred to as 24$_1$, where the section 24 is in line with the subsidiary loop 16. The broken lines show its other two positions, referred to as 24$_2$ and 24$_3$, at which the section 24 is in line with the main rail (position 24$_2$) or in line with the subsidiary loop 32 (position 24$_3$).

FIG. 3 also illustrates pusher 15b which has an inverted T-shape and engages a crown 66 of trolley 14g. Soon trolley 14g will be pushed around a first turn 70 of looping rail 28, and thereafter the crown 66 will be out of reach of the pusher 15b and the trolley 14g will move around looping rail 28 exclusively by gravity. When trolley 14g first enters subsidiary loop 16 and is still within the reach of pusher 15b, trolley 14g will also be forced by gravity in addition to pusher 15b because rail 28 slopes downwardly from its beginning, but the gravitational force is not usually sufficient to separate a trolley from its pusher then because the pushers move relatively quickly.

Also shown in FIG. 3 are a group of trolleys 14h–l with their associated workpieces stacked up at the upper gate of the stop 38 awaiting attention by operator 42. In certain situations, such as when the workpieces require a sewing operation and the operator has the wrong color thread in her sewing machine, the operator may want to put off her work operation on a particular set of workpieces carried by a particular trolley so when said trolley is first in line at the upper gate, she can push another button on control box 50 to advance the trolley through both gates of stop 38 and down to elevator 54. The computer senses that this button has been pushed and directs the elevator to raise the trolley to main rail level, the actuator 18 to move rail section 24 laterally into alignment with looping rail 28, and to hold rail section 24 in this position until a pusher 15 comes along and urges the trolley back onto the entrance 36 of subsidiary loop 16 to recirculate the trolley. The operator can repeat this recirculation process as many times as necessary until other similarly colored workpieces arrive and it is convenient for her to change her thread. It is important for this direct recirculation process as well as for transferring a trolley from one subsidiary loop to another located directly across the main rail, that the entrance of each subsidiary loop 16 is downstream of its exit relative to the main rail 12.

In addition to the mechanisms described above, there are mechanical eyes situated just before the transfer rail 24, the upper gate of the stop 38 and the base of the elevator 54 to help the computer keep track of the trolleys and direct their flow. These mechanical eyes each consist of a depressible switch which extends over the main rail or looping rail as the case may be in the path of the trolleys.

Figure 4:
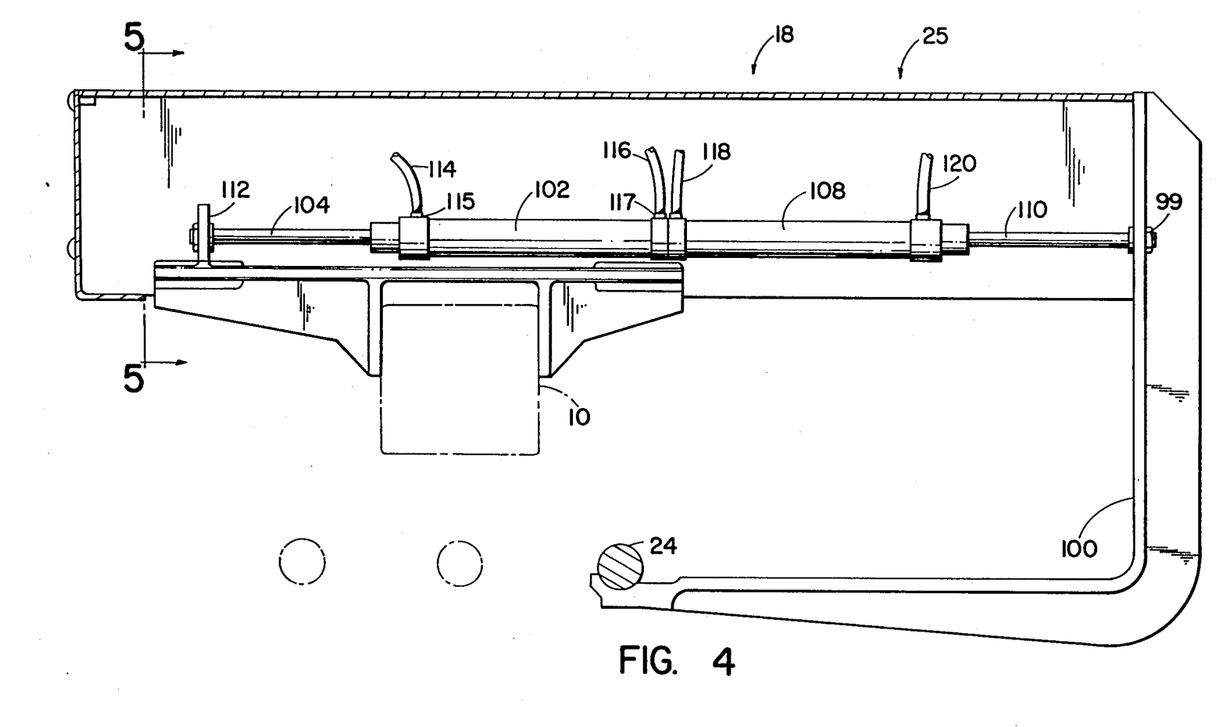
FIG. 4 is a front view in enlarged scale of the transfer switch taken on the line 4—4 of FIG. 3.

FIG. 4 shows a front view of the actuator apparatus 18 for transfer rail section 24. The actuator apparatus comprises an L-shaped support bracket 100 which supports transfer rail section 24, a first piston and cylinder assembly 102 with an integrally-connected piston rod 104, and a second piston and cylinder assembly 108 with an integrally connected piston rod 110. Both piston and cylinder assemblies support and move the bracket 100 and the transfer rail section 24. The actuator apparatus also includes a bracket 112 which secures both piston and cylinder assemblies to the track 10.

Even though the piston and cylinder assemblies 102 and 108 are connected back to back, they do not share any fluid chambers with each other . Also, they operate from a single source of pressurized air which is connected to the assemblies 102 and 108 by air hoses 114, 116, 118, and 120. The piston of assembly 102 is located between a pair of fittings 115 and 117 for the air hoses 114 and 116 respectively so that when pressurized air is directed into hose 114, and hose 116 is vented, the piston rod 104 retracts, and when pressurized air is directed into air hose 116, and hose 114 is vented, piston rod 104 extends. The piston and cylinder assembly 108 is configured similarly, so that when pressurized air is directed into hose 120, and hose 118 is vented, the piston rod 110 retracts and when pressurized air is directed into hose 118, and hose 120 is vented piston rod 110 extends.

When both piston rods 104 and 110 are in their extended postions as shown in FIG. 3, rail section 24 is positioned in line with looping rail 28 as shown in FIG. 1 to bridge the gap in subsidiary loop 16, when one piston rod is extended and the other is retracted, transfer rail section 24 is moved to a center position where the rail section 24 bridges the gap in main rail 12, and when both piston rods are retracted, rail section 24 is positioned in line with the looping rail 30 to bridge the gap in the subsidiary loop 32.

If a subsidiary loop located adjacent the main rail is not paired with another subsidiary loop located directly across the main rail, or if there is another rail such as 31

(shown in FIG. 1) located adjacent to the main rail used for diverting a trolley to another location in a factory, the respective transfer switches need only provide two switching positions. So, the actuator apparatus for this two position switch comprises only one piston and cylinder assembly such as 102.

Figure 5:
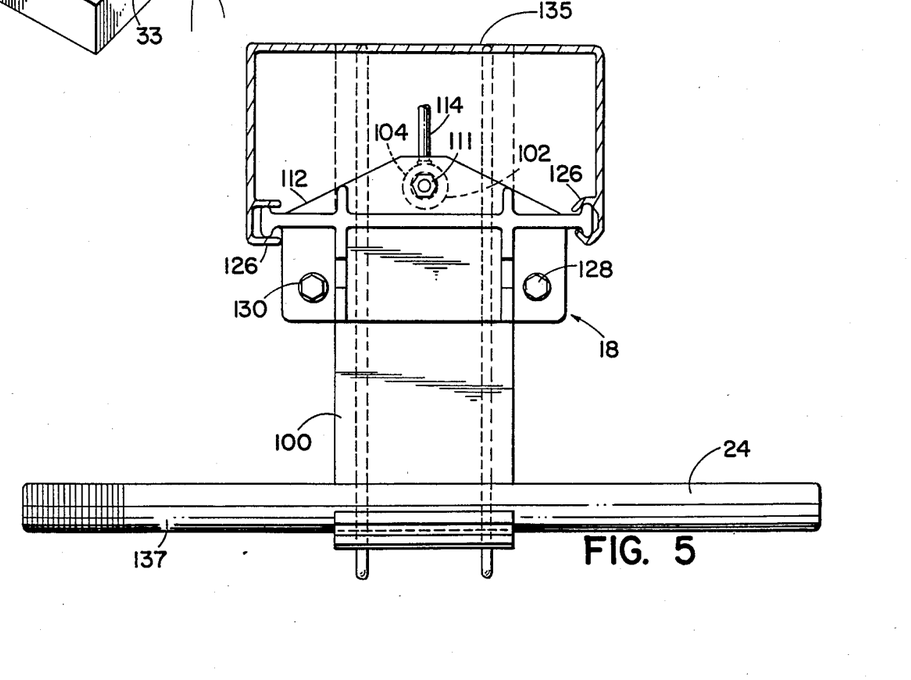
FIG. 5 is a side view in enlarged scale of the transfer switch of FIG. 1 taken on the line 5—5 of FIG. 4.

FIG. 5 shows a side view of the actuator apparatus 18 and the L-shaped bracket 100 which is welded to and supports transfer rail section 24. FIG. 5 also shows a frame 135 for actuator apparatus 18 which receives a bracket 112 at a pair of frame slots 126 and secures it to the frame, and shows holes 128 and 130 for receiving bolts (not shown) to attach the bracket 112 to the outer shell of the propulsion track 10 (See FIG. 2).

Transfer rail section 24 has a plurality of corrugations 137 on its downstream side so that when a trolley is being transferred laterally by the rail section it cannot roll off due to wind or an inadvertent slope in the rail section.

Figure 6:
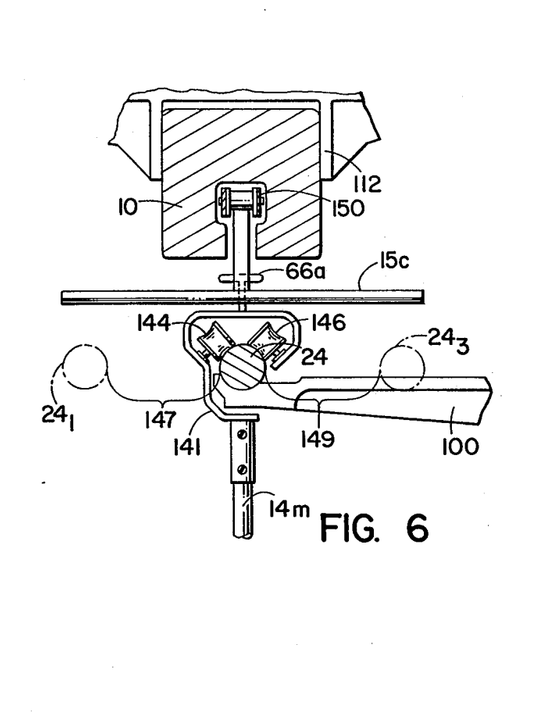
FIG. 6 is a view in enlarged scale also taken on the line 4—4 of FIG. 3 showing the switch bracket in a different position than in FIG. 4 and showing further details of the propulsion track and of a trolley.

FIG. 6 shows a rear view of a trolley 14m and a pusher 15c which engages it. The trolley 14m has two wheels 144 and 146 which are shown riding on transfer rail 24, and similarly ride on main rail 12 and other subsidiary rails at other times. The wheels attach to the inside of an upper hook shaped portion 141 of the trolley and straddle the rail upon which they ride to provide balance. At the top of trolley 14m is a T-shaped crown 66a which is the portion of the trolley actually engaged by the pusher 15c. Pusher 15c like the other pusher described above has an inverted T-shape and extends downwardly from the inside of the propulsion track 10, and within the track, an endless, moving chain 150 attaches to the pusher 15c and drives it. The horizontal portion of the pusher 15c is wide enough to span two lateral spaces 147 and 149 to reach a trolley which is on transfer rail section 24 when the transfer rail section 24 is in any position so that the pusher can engage the crown 66a while trolley 14m is being transferred to a subsidiary loop. With this width, the pusher can also reach a trolley located at the top of an elevator and push it onto a waiting transfer rail section for routing elsewhere.

Figure 7:
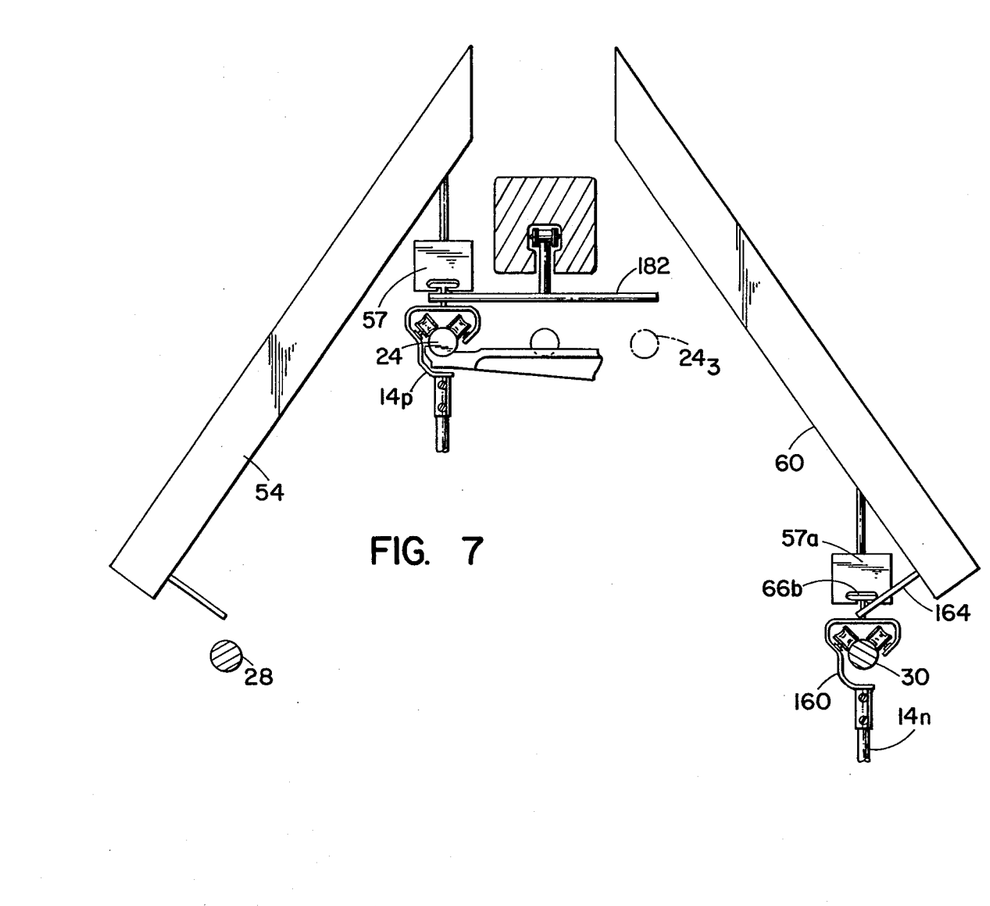
FIG. 7 is a view in enlarged scale also taken on the line 5—5 of FIG. 1 but in comparison to FIG. 5 showing the switch moved to an alternate position and also showing the elevators of the two associated subsidary loops.

FIG. 7 shows elevator 60 which has a slotted track section 57a serving as an elevator car. When the elevator car is at the bottom of the elevator the slotted track is in line with the end of looping rail 30. FIG. 7 also shows a trolley 14n which is stopped at the base of the elevator 60 by a piston rod 164 and waits to enter the elevator car. The piston rod 164 protrudes from elevator 60 and is one of a pair of coplanar piston rods which act as a gate at the entrance of the elevator car 57a. The associated piston and cylinder assemblies are not shown, and the other piston rod is not visible because it is located directly behind rod 164. The two piston rods are spaced apart by a few inches so that they can corral a single trolley, the one closest to the elevator when more than one are waiting there.

Then, when the elevator car 57a is empty and in position to receive a trolley, the computer can direct the piston rod closest to the elevator to retract and allow a previously corralled trolley such as a trolley identified as 14m in FIG. 7 access to the elevator car. The trolley 14n will be pulled into the elevator car by another piston and cylinder assembly (not shown) situated above and in line with the slotted track section. The piston rod of this assembly extends over the corral and has a hinged claw at the end to grab a single trolley such as 14n by its crown and pull it into the slotted track 57a of the elevator. Then when there is a break in a parade of trolleys on the main rail, the master computer directs the elevator 60 to raise the trolley 14n and piston and cylinder assemblies 102 and 108 to move transfer rail 24 to position $24_3$ which is in line with subsidiary loop 30. Then, when the elevator car 57a reaches the top and the next pusher arrives, the pusher will engage a crown 66b and push the trolley 14n from slotted track section 57b onto transfer rail 24. FIG. 7 also shows such a trolley 14p being transferred from an elevator car 57 to transfer rail 24. From the transfer rail section, the trolley 14n can be transferred to the beginning of subsidiary loop 30, main rail 12, or subsidiary loop 28 as discussed above.

By the foregoing, a conveyorized transport system has been described in the preferred embodiment of the invention. However, it should be understood that numerous modifications and substitutions may be made without departing from the spirit of the invention. For example, in a slight modification to the illustrated embodiment a transfer rail section is made with parallel, slanted tips and the gaps of the main rail and associated subsidiary loops are shaped to receive this transfer rail section so that the transfer rail section will move horizontally but angularly between said gaps. In another slight modification to the illustrated embodiment, the tips of the transfer rail section are flat as in transfer rail section 24 but an actuator apparatus moves the transfer rail section in an upward incline as it moves the transfer rail to one side and in a downward incline as it moves the transfer rail to the other side and keeps the transfer rail section horizontal all the while. In this latter modification to the invention, the entrance and exit of the associated subsidiary loops are displaced vertically from the level of the main rail.

Accordingly, the invention has been described by way of illustration rather than limitation.

We claim:

1. A switching apparatus used in a conveyorized transport system for tranferring a trolley between a first rail and an adjacent subsidiary loop, said apparatus comprising:
    a rail section used for transferring said trolley between said first rail and said subsidiary loop, said first rail and said subsidiary loop each haivng a gap for receiving the transfer rail section,
    means for moving said transfer rail section from a first position bridging said gap in said first rail to a second position bridging said gap in said subsidiary loop, said means for moving including means for unobstructively supporting said transfer rail section such that said trolley and workpieces it carries are able to travel the entire length of said transfer rail section, and
    propulsion means for exerting a positive driving force on said trolley to move said trolley in one direction along the entire length of said transfer rail section during an interval in which said transfer rail section is initially located at said first position and receives said trolley from said first rail, moves from said first position to said second position carrying said trolley, and then remains at said second position while said trolley is discharged onto said subsidiary loop.

2. The switching apparatus defined in claim 1 wherein
    said propulsion means exerts a positive driving force on said trolley while said transfer rail section is in said second position and said trolley is on said subsidiary loop upstream of said transfer rail section relative to the direction of movement of said trolley on said first rail to urge said trolley onto said transfer rail section.

3. The switching apparatus defined in claim 1 wherein there is a lateral space between said first rail and said subsidiary loop and said propulsion means comprises a pusher for propelling said trolley along said transfer rail section, said pusher spanning said lateral space.

4. The switching apparatus defined in claim 1 wherein said gap in said first rail and said gap in said subsidiary loop lie in a substantially horizontal plane, and said transfer rail section moves substantially laterally between said gap in said first rail and said gap in said subsidiary loop.

5. The switching apparatus defined in claim 1 wherein
said means for moving said transfer rail section further includes means for moving said transfer rail section from said second position to said first position, and
said propulsion means exerts a positive driving force on said trolley to move said trolley continuously along the entire legth of said transfer rail section during an interval in which said transfer rail section is initially located at said second position to receive a trolley located on said subsidiary loop upstream of said transfer rail section, then is moved from said second position to said first position carrying said trolley and then is supported at said first position while said trolley is discharged onto said first rail.

6. A switching apparatus as set forth in claim 1 wherein
said means for supporting said transfer rail section comprises a bracket which supports said transfer rail section from below leaving an upper surface of said transfer rail section unimpeded to allow said trolley to roll on said transfer rail section past said bracket, and means for supporting said bracket from a position above said trolley when said trolley travels along said transfer rail section to avoid interfering with said trolley on said transfer rail section.

7. A switching apparatus as set forth in claim 1 wherein said means for moving said transfer rail section comprises
a generally L-shaped bracket having a generally horizontal portion which supports said transfer rail section and an adjoining generally vertical portion, and
a piston and cylinder assembly attached to the generally vertical portion of said bracket to support and move said bracket and said transfer rail section.

8. A switching apparatus used for transferring a trolley between a first rail and an adjacent second rail, said apparatus comprising:
a rail section used for transferring said trolley between said first and second rails, said first rail having a gap for receiving the transfer rail section, and said second rail positioned for receiving the transfer rail section, and
means for moving said transfer rail section generally laterally from a first position bridging said gap in said first rail to a second position where said transfer rail section is disassociated from said first rail and aligns with said second rail, said second position being generally horizontal to said first position, and
means for propelling said trolley during switching from a position on said first rail upstream of said rail section relative to the direction of trolley movement on said first rail and onto one end of said rail section while said rail section is located at said first position, along said rail section toward the other end of said rail section while said rail section is moved to said second position, and off said other end of said rail section and onto said second rail while said rail section is located at said second position.

9. A conveyorized transport system for transporting workpieces to a plurality of work stations, said system comprising:
a first rail,
a plurality of workpiece carrying trolleys movable along said first rail,
a subsidiary loop having an entry end and a discharge end, said ends being located adjacent to said first rail,
switching means associated with said subsidiary loop for switching a trolley from said first rail to said entry end of said subsidiary loop and for switching a trolley from said discharge end of said subsidiary loop to said first rail, said entry end of said subsidiary loop being located dowstream of said discharge end of said subsidiary loop with respect to the direction of travel of said trolleys along said first rail, and
means for propelling said trolleys in one direction along said first rail and for propelling a trolley while said trolley is being transferred by said switching means between said first rail and said subsidiary loop.

10. The conveyorized transport system defined in claim 9 wherein
the switching means comprises a rail section used for transferring a trolley between the first rail and a subsidiary loop, the first rail and the subsidiary loop each having a gap for receiving said transfer rail section, and means for moving the transfer rail section between a first position where it bridges said gap in the first rail and a second position where it bridges said gap in said subsidiary loop, and
said propelling means includes a pusher movable along a path parallel to said first rail, said pusher having a reach large enough to engage a trolley while said trolley is on said transfer rail section and said transfer rail section is in either said first position or said second position.

11. A conveyorized transport system for transporting workpieces to a plurality of work stations, said system comprising:
a main generally horizontal rail,
a plurality of workpiece carrying trolleys movable along said main rail,
a subsidiary loop having an entry end and a discharge end, both of which ends are located adjacent said main rail,
switching means associated with said subsidiary loop for switching a trolley from said main rail, to said entry end of said subsidiary loop and for switching a trolley from said discharge end of said subsidiary loop to said main rail, said entry end of said subsidiary loop being located downstream of said discharge end of said subsidiary loop with respect to the direction of travel of said trolleys along said main rail, and means for propelling said trolleys in one direction along said main rail and for propelling a trolley while said trolley is being transferred by said switching means between said main rail and said subsidiary loop.

12. The conveyorized transport system defined in claim 11 wherein the switching means comprises:

a generally horizontal rail section used for transferring a trolley between the main rail and the subsidiary loop, the main rail and the subsidiary loop each having a gap for receiving said transfer rail section, said gaps being adjacent one another, and means for moving the transfer rail section between a first position where it bridges said gap in the main rail and a second position where it bridges said gap in said subsidiary loop.

13. The conveyorized transport system defined in claim 12 wherein said propelling means includes a pusher moving along a path parallel to said main rail, said pusher having a reach large enough to engage a trolley while said trolley is on said transfer rail section and said transfer rail section is in either said first position or said second position.

14. The conveyorized transport system defined in claim 13 wherein said propelling means further includes a propulsion track situated above the main rail and generally following the course of the main rail, and wherein said pusher includes a generally horizontal pusher bar extending below and driven along said propulsion track, said pusher bar engaging said trolley.

15. A conveyorized transport system for transporting a workpiece from a main rail sequentially to two work stations located across from one another on opposite sides of the main rail, said system comprising:

a main rail, a plurality of workpiece carrying trolleys movable along said main rail, means for propelling said trolleys in one direction along said main rail, first and second subsidiary loops, each leading to one of the work stations, said first subsidiary loop having an entry end for receiving a trolley and a discharge end for discharging said trolley, said entry end of said first subsidiary loop being located downstream of said discharge end of said first subsidiary loop with respect to the general direction of travel of said trolleys on the main rail, said first and second subsidiary loops being located directly across the main rail from one another, and three-mode switching means associated with said first and second subsidiary loops, said three-mode switching means used for transferring said trolley between said main rail and said first subsidiary loop, between said first subsidiary loop and said second subsidiary loop, and between said second subsidiary loop and the main rail, the main rail and said first and second subsidiary loops each having a gap, said three-mode switching means including a rail section which is movable from a first position where said rail section bridges the gap in the main rail, to a second position where said rail section bridges the gap in said first subsidiary loop and to a third position where said rail section bridges the gap in said second subsidiary loop.

16. The conveyorized transport system defined in claim 15 wherein said three-mode switching means includes:

means for moving the transfer rail section between said gap in the main rail and said gap in said first subsidiary loop, between said gap in said first subsidiary loop and said gap in said second subsidiary loop, and between said gap in said second loop and said gap in the main rail, and wherein said propelling means exerts a positive driving force on said trolley while said trolley is on the transfer rail section and said transfer rail section is in either said first position, said second position, or said third position so that said trolley moves steadily during all three switching modes.

17. The conveyorized transport system defined in claim 16 wherein the means for moving the transfer rail section comprises:

a first piston and cylinder assembly, means for securing one end of said first piston and cylinder assembly to a stationary point relative to said main rail, a second piston and cylinder assembly with one end attaching to the unsecured end of said first piston and cylinder assembly, and a bracket connecting the other end of said second piston and cylinder assembly to the transfer rail section so that the transfer rail section can be moved by said first and second piston and cylinder assemblies between said first, second, and third positions.

18. The conveyorized transport system defined in claim 15 wherein said second subsidiary loop has an entry end for receiving a trolley from said three mode switching means and a discharge end for discharging said trolley to said three mode switching means, said entry end of said second subsidiary loop being located downstream of said discharge end of said second subsidiary loop with respect to the direction of travel of said trolleys along the main rail so that the transport system is flexible in its ability to route workpieces carried by said trolley.

19. A conveyorized transport system for transferring workpieces to a work station, said system comprising:

a main rail, a plurality of workpiece carrying trolleys movable along the main rail, a transfer rail section, a subsidiary loop leading to said work station, the main rail having a gap adjacent to said subsidiary loop and said subsidiary loop having a gap across from said gap in the main rail, said subsidiary loop having an entry end and a discharge end, said entry end of said subsidiary loop being located downstream of said discharge end of said subsidiary loop with respect to the direction of travel of said trolleys along the main rail, said subsidiary loop comprising a looping rail which slopes downwardly, and an elevator for receiving a trolley from said looping rail and elevating it for subsequent discharge to said transfer rail section, means for moving said transfer rail section from a first position bridging said gap in the main rail to a second position bridging said gap in said subsidiary loop so that said trolley can be transferred between the main rail and said subsidiary loop, and means for exerting a positive driving force on said trolley while said trolley is being transported by said transfer rail section between the main rail and said subsidiary loop.

* * * * *